(12) United States Patent
Nagaoka et al.

(10) Patent No.: US 11,215,592 B2
(45) Date of Patent: Jan. 4, 2022

(54) METHOD AND DEVICE FOR ISOLATING AND ANALYZING TARGET SUBSTANCE IN SOLUTION

(71) Applicants: MITSUI MINING & SMELTING CO., LTD., Tokyo (JP); BL TEC K.K., Tokyo (JP)

(72) Inventors: Makoto Nagaoka, Ageo (JP); Fumihiro Yoshinaga, Omuta (JP); Atsumi Koyanagi, Omuta (JP); Shunichi Hatamoto, Hida (JP); Yozo Ishihara, Omuta (JP); Makiko Kumagai, Chuo-ku (JP); Takashi Nishimura, Chuo-ku (JP)

(73) Assignees: MITSUI MINING & SMELTING CO., LTD., Tokyo (JP); BL TEC K.K., Tokyo (JP)

( * ) Notice: Subject to any disclaimer, the term of this patent is extended or adjusted under 35 U.S.C. 154(b) by 0 days.

(21) Appl. No.: 17/278,446

(22) PCT Filed: Nov. 27, 2019

(86) PCT No.: PCT/JP2019/046341
§ 371 (c)(1),
(2) Date: Mar. 22, 2021

(87) PCT Pub. No.: WO2020/116274
PCT Pub. Date: Jun. 11, 2020

(65) Prior Publication Data
US 2021/0318278 A1 Oct. 14, 2021

(30) Foreign Application Priority Data

Dec. 3, 2018 (JP) .............................. JP2018-226851

(51) Int. Cl.
*G01N 31/00* (2006.01)
*G01N 21/3504* (2014.01)

(52) U.S. Cl.
CPC ......... *G01N 31/00* (2013.01); *G01N 21/3504* (2013.01)

(58) Field of Classification Search
CPC .......................... G01N 31/00; G01N 21/3504
See application file for complete search history.

(56) References Cited

U.S. PATENT DOCUMENTS

| 5,668,014 A | 9/1997 | Aoki et al. |
| 6,171,552 B1 | 1/2001 | Takeya et al. |
| 2016/0115787 A1 | 4/2016 | Mostowfi et al. |

FOREIGN PATENT DOCUMENTS

| JP | 69-30062 | 2/1984 |
| JP | S61-7467 A | 1/1986 |

(Continued)

OTHER PUBLICATIONS

Notice of Reasons for Refusal for JP App. No. 2018-226851, dated Jul. 11, 2019 (w/ translation).

(Continued)

*Primary Examiner* — Jennifer Wecker
(74) *Attorney, Agent, or Firm* — Greenblum & Bernstein, P.L.C.

(57) ABSTRACT

There is provided a separation method in which a target component in a solution can be separated simply but safely and efficiently without contamination from the environment. This method includes: providing a solution containing a target component, and a reaction reagent; while continuously feeding the solution and the reaction reagent to a flow path, intermittently injecting bubbles into the flow path to produce a gas-liquid slug flow in which a mixed liquid containing the solution and the reaction reagent is segmented into a plurality of droplets by the bubbles; continu- (Continued)

ing the feed of the gas-liquid slug flow in the flow path, thereby facilitating the mixing of the solution and the reaction reagent, and the gasification of the target component by the mixing, in each droplet, and the movement of a target component-derived gas produced by the gasification to the bubbles; and recovering the target component-derived gas with an absorbing liquid.

15 Claims, 3 Drawing Sheets

(56) References Cited

FOREIGN PATENT DOCUMENTS

| JP | S62-37161 Y2 | 9/1987 |
| JP | H5-17496 82 | 3/1993 |
| JP | H10-274657 A | 10/1998 |
| JP | 2004-233061 A | 8/2004 |
| JP | 2004233061 A * | 8/2004 |
| JP | 2009-288228 A | 12/2009 |
| JP | 2010-44034 A | 2/2010 |
| JP | 2011-247617 A | 12/2011 |
| JP | 2014-16299 A | 1/2014 |
| JP | 2014016299 A * | 1/2014 |
| JP | 2014-48106 A | 3/2014 |
| JP | 2017-146123 A | 8/2017 |

OTHER PUBLICATIONS

Decision to Grant a Patent for JP App. No. 2018-226851, dated Oct. 1, 2019 (w/ translation).

ISR for PCT/JR2019/046341, dated Feb. 25, 2020.

JIS H 1403-2001 "Methods for chemical analysis of tungsten materials", 2001 (w/ translation).

Volker Hessel et al., "Gas-Liquid and Gas-Liquid-Solid Microstructured Reactors: Contacting Principles and Applications", Ind. Eng. Chem, Res. 2005, 44, dated Aug. 2005, pp. 9750-9769.

* cited by examiner

METHOD AND DEVICE FOR ISOLATING AND ANALYZING TARGET SUBSTANCE IN SOLUTION

TECHNICAL FIELD

The present invention relates to a method and apparatus for separating or analyzing a target component in a solution.

BACKGROUND ART

In quantitative analysis to determine the content of a target component contained in a solution, interfering components that hinder the quantification of the target component may be mixed in the solution. In such a case, an operation to separate the target component from the interfering components is generally performed.

In this respect, a method in which a target component in a solution is gasified for vaporization and separation is known. For example, Non Patent Literature 1 (JIS H 1403-2001 "Methods for chemical analysis of tungsten materials") discloses that regarding the separation of Si, a sample is decomposed by hydrogen peroxide, sulfuric acid is added to form an acidic solution, hydrofluoric acid is further added to this acidic solution, and then nitrogen gas is passed through the solution to vaporize and separate Si in the form of $SiF_4$. Patent Literature 1 (JP2017-146123A) discloses that by using nitric acid instead of sulfuric acid to form an acidic solution, in the Si separation method of Non Patent Literature 1 described above, Si can be separated even in a sample insoluble in sulfuric acid or the like to which it is difficult to apply the method of Non Patent Literature 1.

A method in which a gas sample comprising a target component is brought into continuous contact with an absorbing liquid that has high dissolving power for the target component or reacts selectively with the target component, to recover the target component is also known. For example, Patent Literature 2 (JP2004-233061A) discloses a gas collection apparatus in which a gas sample comprising a component to be measured is ejected by a nebulizer and fed to a denuder tube, the gas sample and an absorbing liquid in the form of droplets are brought into contact with each other inside the denuder tube to collect the component to be measured, in the absorbing liquid, and then the absorbing liquid is separated from the gas in a gas-liquid separation pipe and recovered.

A method in which a sample is continuously injected into a tube together with a reagent while segmented by a gas, they are mixed, and this mixed liquid is decomposed in a reaction manifold and then analyzed by a detector, referred to as a continuous flow analysis method, is known. For example, Patent Literature 3 (JP2009-288228A) discloses an automatic analysis, quantification, and observation method and apparatus for total nitrogen and total phosphorus set to stop a mixed liquid in a reaction manifold for 10 to 30 minutes and perform heating while performing UV irradiation at a temperature of 80 to 90'C, to decompose the mixed liquid.

CITATION LIST

Patent Literature

Patent Literature 1: JP2017-146123A
Patent Literature 2: JP2004-233061A
Patent Literature 3: JP2009-288228A

Non Patent Literature

Non Patent Literature 1: JIS H 1403-2001 "Methods for chemical analysis of tungsten materials"

SUMMARY OF INVENTION

According to the vaporization and separation method by the gasification of a target component in a solution described above, the target component can be analyzed without the influence of interfering components, and therefore the vaporization and separation method is suitable for high accuracy and high sensitivity quantitative analysis. However, in the conventional method described in Non Patent Literature 1 and the like, the time required for vaporization and separation is long, such as it being necessary to pass a gas (for example, for about 30 minutes) in order to separate a target component from a solution, and quick separation and analysis of the target component are hindered. Further problems are that there is a risk of suffering a chemical injury at the time of the replacement of a sample or a reagent, and that in low concentration analysis, contamination from the environment can occur. Therefore, a method for quickly performing analysis under conditions in which the influence of interfering components is eliminated and which are safe and without contamination from the environment is desired.

The present inventors have now obtained findings that by continuing liquid feed to a flow path while segmenting a solution and a reaction reagent by bubbles, a target component in a solution can be separated simply but safely and efficiently (for example, for about 2 minutes) without contamination from the environment because of being in the flow path, and thus the quantitative analysis of the target component can be performed quickly and with high accuracy.

Therefore, it is an object of the present invention to provide a separation method in which a target component in a solution can be separated simply but safely and efficiently without contamination from the environment, and a quick and high accuracy method for analyzing a target component using such a separation method. It is another object of the present invention to provide a separation apparatus and an analysis apparatus that can implement such a separation method or analysis method.

According to an aspect of the present invention there is provided a method for separating a target component in a solution, comprising the steps of:

providing a solution comprising a target component, and a reaction reagent capable of gasifying the target component;

while continuously feeding the solution and the reaction reagent to a flow path, intermittently injecting bubbles into the flow path to produce a gas-liquid slug flow in which a mixed liquid comprising the solution and the reaction reagent is segmented into a plurality of droplets by the bubbles;

continuing the feed of the gas-liquid slug flow in the flow path, thereby facilitating the mixing of the solution and the reaction reagent, and the gasification of the target component by the mixing, in each droplet, and the movement of a target component-derived gas produced by the gasification to the bubbles; and recovering the target component-derived gas that has moved to the bubbles with an absorbing liquid.

According to another aspect of the present invention, there is provided a method for analyzing a target component in a solution, comprising the steps of:

separating the target component from the solution according to the above method; and quantitatively analyzing the target component separated from the solution.

According to another aspect of the present invention, there is provided a separation apparatus for separating a target component in a solution, comprising:

a flow path for flowing a solution comprising a target component, and a reaction reagent capable of gasifying the target component:

solution injection means provided on an upstream side of the flow path for continuously injecting the solution into the flow path;

reagent injection means provided on the upstream side of the flow path for continuously injecting the reaction reagent into the flow path;

bubble injection means connected to the upstream side of the flow path and a downstream side of the solution injection means and the reagent injection means for intermittently injecting bubbles into the flow path to produce a gas-liquid slug flow in which a mixed liquid comprising the solution and the reaction reagent is segmented into a plurality of droplets by the bubbles;

a liquid feed pump that facilitates the feed of the gas-liquid slug flow in the flow path, thereby allowing the mixing of the solution and the reaction reagent, and the gasification of the target component by the mixing, in each droplet, and the movement of a target component-derived gas produced by the gasification to the bubbles;

a gas-liquid separator connected to a downstream side end of the flow path for separating the bubbles comprising the target component-derived gas from the gas-liquid slug flow; and recovery means connected to a gas outlet of the gas-liquid separator for allowing an absorbing liquid to absorb the target component-derived gas for recovery.

According to another aspect of the present invention, there is provided an analysis apparatus for analyzing a target component in a solution, comprising:

the separation apparatus; and analysis equipment connected to the recovery means of the separation apparatus for quantitatively analyzing the target component.

DESCRIPTION OF EMBODIMENTS

The method of the present invention comprises the steps of (1) the provision of a solution and a reaction reagent, (2) the production of a gas-liquid slug flow, (3) the gasification of a target component, (4) the recovery of a target component-derived gas, and (5) the quantitative analysis of the target component performed as desired.

Figure 1:
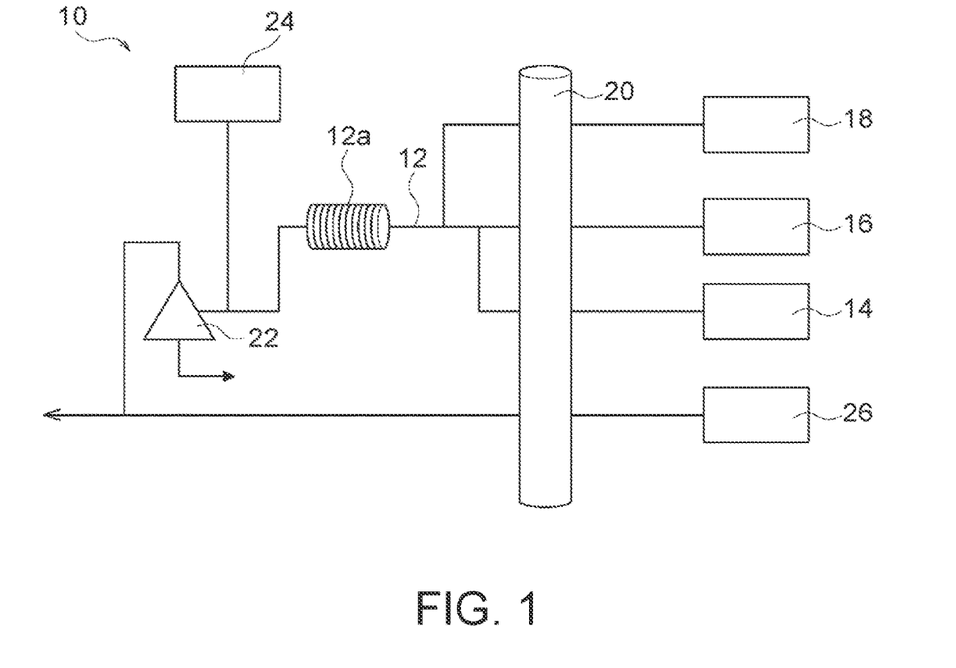
FIG. 1 is a system flow diagram showing one example of the separation apparatus of the present invention.

One example of a separation apparatus preferably for use in the separation method of the present invention is shown in FIG. 1. The separation apparatus 10 of the present invention shown in FIG. 1 comprises a flow path 12, solution injection means 14, reagent injection means 16, bubble injection means 18, a liquid feed pump 20, a gas-liquid separator 22, and recovery means 26. The solution injection means 14 and the reagent injection means 16 are provided on the upstream side from the bubble injection means 18 in the flow path 12. Either one of the solution injection means 14 and the reagent injection means 16 may be on the more upstream side in the flow path 12. More preferably, they are connected to the flow path 12 in the order of the reagent injection means 16 and the solution injection means 14 from the upstream side of the flow path 12, as shown in FIG. 1, in order to reduce the influence of the sulfuric acid and the like contained in the solution on viscosity and the like. The bubble injection means 18 is further connected to the flow path 12 that has passed through the reagent injection means 16 and the solution injection means 14, and the flow path 12 that has passed through the bubble injection means 18 is guided to a coil portion 12a. On the downstream side from the coil portion 12a, the gas-liquid separator 22 is connected to the downstream side end of the flow path 12. A gas feed apparatus 24 may be provided on the upstream side of the vicinity of the gas-liquid separator 22 in the flow path 12, as desired. The recovery means 26 is connected to the gas outlet of the gas-liquid separator 22. Each of the steps (1) to (5) will be described below with appropriate reference to the drawings.

(1) Provision of Solution and Reaction Reagent

A solution comprising a target component, and a reaction reagent capable of gasifying the target component are provided. The target component may be any component that can change into a gas state through the reaction with the reaction reagent, or the like. Preferred examples of the target component include Si, F. As, Sb, Se, Ge, Cl, and compounds thereof. More preferably, the target component is Si or a compound thereof and/or F or a compound thereof, further preferably Si or a compound thereof. When the substance of interest from which the target component is separated is a liquid, it may be used as it is, or it may be diluted with any liquid. On the other hand, when the above substance of interest is a solid, the solution comprising the target component can be formed by dissolving it by a known method using a liquid such as an acid, an alkali, or water. For example, when the above substance of interest is a metal or a metal oxide, the solution comprising the target component can be preferably prepared by adding an appropriate amount of an acid such as hydrofluoric acid (1+1) to the metal or metal oxide and performing pressure decomposition. As used herein, "reagent R (m+n)" means a reagent in which a reagent R and water are mixed in a volume ratio of m:n (m and n are natural numbers).

Two or more reaction reagents may be used, and in that case, all types of reaction reagents may be separately provided, or a mixture of some or all types of reaction reagents may be provided. When the reaction does not proceed (that is, the target component does not gasify) by only adding some or all types of reaction reagents to the solution, previously adding some or all types of reaction reagents to the solution is allowed.

(2) Production of Gas-Liquid Slug Flow

The target component-containing solution and the reaction reagent provided in the above (1) are continuously fed to the flow path 12 from the solution injection means 14 and the reagent injection means 16 respectively. While the above liquid feed is performed, bubbles are intermittently injected from the bubble injection means 18 into the flow path 12. Thus, a gas-liquid slug flow in which the mixed liquid comprising the solution and the reaction reagent is segmented into a plurality of droplets by the bubbles is produced. The bubbles may comprise air, nitrogen gas, argon gas, or the like, and their type is not particularly limited. When all types of reaction reagents are previously added to the solution, the solution and the reaction reagent should be continuously fed from the solution injection means 14 to the flow path 12 without separately providing the reagent injection means 16. In this case, it can be said that the solution injection means 14 also functions as the reagent injection means 16.

The solution injection means 14 is not particularly limited as long as it is means or equipment that can continuously inject the solution into the flow path 12. A commercially available autosampler or the like can be preferably used. The reagent injection means 16 is not particularly limited as long as it is means or equipment that can continuously inject the reaction reagent into the flow path 12. For example, means such as sucking the reaction reagent into the flow path 12 using a tube and a pump is also possible. The bubble injection means 18 is not particularly limited as long as it is means or equipment that can intermittently inject bubbles into the flow path 12 to produce the gas-liquid slug flow. For example, means such as sucking bubbles into the flow path 12 using a tube and a pump is also possible. For the bubble injection means 18, the timing of injecting bubbles can be preferably changed according to the viscosity and flow rates of the solution and the reaction reagent, and the like. A continuous flow analysis apparatus comprising such solution injection means 14, reagent injection means 16, and bubble injection means 18 is commercially available, and examples thereof include a group of products referred to as AutoAnalyzer manufactured by BL TEC K.K.

Figure 2:
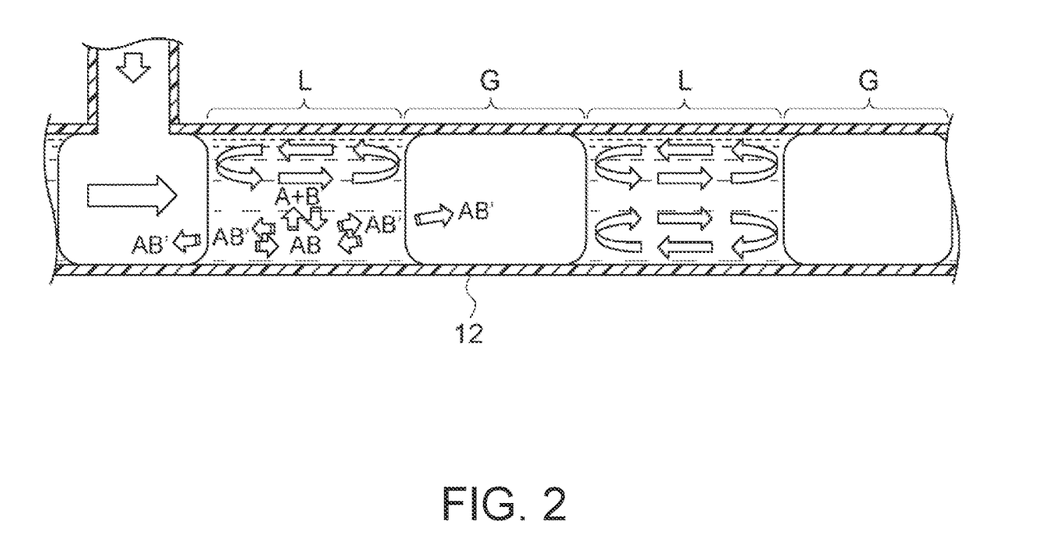
FIG. 2 is a schematic diagram for conceptually explaining a gas-liquid slug flow in a flow path.

As shown in FIG. 2, the gas-liquid slug flow is composed of bubbles G occupying the cross section of the flow path 12, and droplets L segmented by these bubbles G being alternately present. The droplets L may comprise small bubbles of a size not occupying the cross section of the flow path 12. In any case, the mixing of neighboring droplets L with each other is prevented by the presence of the bubbles G, and therefore even when the target component is continuously separated from a different type of solution, the solution in another lot, or the like, the cross-contamination between the solutions can be kept to a minimum.

For the flow path 12, a commercially available tube or the like can be utilized as long as it is a member through which the target component-containing solution and the reaction reagent can be flowed. The flow path 12 is not particularly limited. From the viewpoint of easily producing the gas-liquid slug flow, the inner diameter of the flow path 12 is preferably 0.05 to 20 mm, more preferably 0.1 to 10 mm, and further preferably 0.1 to 2 mm. The flow path 12 is preferably composed of a resin. Preferred examples of the resin include fluororesins, PE (polyethylene), and PP (polypropylene). More preferably, the resin is a fluororesin from the viewpoint of acid resistance. Examples of preferred fluororesins include PTFE (polytetrafluoroethylene), PFA (tetrafluoroethylene-perfluoroalkyl vinyl ether copolymer), and FEP (ethylene tetrafluoride-propylene hexafluoride copolymer). The flow path 12 is desirably composed of a material in which the target component is not contained, from the viewpoint of preventing contamination.

(3) Gasification of Target Component

The feed of the gas-liquid slug flow in the flow path 12 is continued by the liquid feed pump 20. Thus, the mixing of the solution and the reaction reagent, and the gasification of the target component by the mixing, in each droplet L, and the movement of the target component-derived gas produced by the gasification to the bubbles G are facilitated. In other words, as shown in FIG. 2, the gas-liquid slug flow is fed to the downstream side (the right side in FIG. 2) of the flow path 12, and thus convection occurs in the individual droplets L, and the mixing of the solution and the reaction reagent is promoted (mixing effect). As a result, a component A comprising the target component in the solution (which can be the target component itself) and a component B in the reaction reagent (which can be the reaction reagent itself) react with each other to produce a component AB. The produced component AB may be the target component-derived gas, or when the component AB changes further in the mixed liquid to form a component AB', as shown in FIG. 2, the component AB' may be the target component-derived gas. In any case, the mixing of the solution and the reaction reagent is promoted by the convection occurring in the droplets L, and thus the target component contained in the solution gasifies. The component AB or the component AB' that is the target component-derived gas produced by the gasification of the target component in this manner moves to the bubbles G, and thus the target component is vaporized and separated. In this respect, in the method of the present invention, the target component-derived gas can be efficiently extracted into the bubbles G by the fact that the mixing of the solution and the reaction reagent and the gasification of the target component are promoted by the above mixing effect, and that the droplets L and the bubbles G constitute the gas-liquid slug flow to increase the contact area between the liquid phase and the gas phase. In this manner, in the method of the present invention, the bubbles G achieve not only the effect of segmenting the droplets L to prevent cross-contamination, but also an effect as a medium into which the target component-derived gas is efficiently extracted by gas-liquid partition.

For example, in the case of a solution comprising Si or a compound thereof as a target component, the following reaction 1 and reaction 2 occur by the mixing of Si in a hydrofluoric acid and sulfuric acid solution. The symbol "W" in the reaction formulas indicates a reversible reaction.

$$H_2SiO_3 + 6HF \Leftrightarrow H_2SiF_6 + 3H_2O \qquad \text{Reaction 1:}$$

$$H_2SiF_6 \Leftrightarrow SiF_4 + 2HF \qquad \text{Reaction 2:}$$

In other words, the reversible reaction of the above reaction 1 proceeds in the right direction by a sulfuric acid dehydration reaction. Further, as shown in the reaction 2, a $SiF_4$ molecule is produced by a collision between a $H_2SO_4$ molecule and a $H_2SiF_6$ molecule, and further the $SiF_4$ gasifies by a collision between $H_2SO_4$ and the $SiF_4$ molecule. In this respect, Non Patent Literature 1 discloses that in order to vaporize and separate $SiF_4$, nitrogen gas is passed through a solution at 1.0 L per minute for 30 minutes. In contrast to this, according to the findings of the present inventors, it has been found that when the method of the present invention is used, a target component gas comprising Si (typically $SiF_4$) can be extracted into the bubbles G in several tens of seconds to several minutes (for example, about 2 minutes). In this manner, the method of the present invention is a simple method in which liquid feed is continued while a solution and a reaction reagent are segmented by bubbles, but a target component in a solution can be efficiently separated, and thus the quantitative analysis of the target component can be performed quickly and with high accuracy. In addition, the target component is separated by continuing the feed of the same solution and reaction reagent, and therefore the number of times of replacement of a sample and a reagent can be decreased (no replacement can be performed in some cases), and as a result, the risk of suffering a chemical injury or the like due to the replacement of the sample or the reagent can be decreased. Moreover, the target component is separated in a flow path, and therefore it is also possible to effectively prevent or suppress the contamination of the sample by the mixing of foreign materials from the environment.

From the above viewpoints, the solution preferably comprises hydrofluoric acid, and the reaction reagent preferably comprises sulfuric acid. When the solution is insoluble in sulfuric acid, or when the precipitation of a sulfate or the like is caused, the reaction reagent preferably comprises another acid such as nitric acid or fuming nitric acid, instead of sulfuric acid. From the viewpoint of easily vaporizing and separating the target component, the target component-derived gas is preferably in the form of a fluoride and/or a hydride, more preferably in the form of a fluoride.

The gasification of the target component is preferably performed at a temperature less than the boiling point of the solution from the viewpoint of performing quantitative analysis in which the influence of the acid or the like used is reduced. Thus, the target component can be separated even more quickly without requiring heating. Therefore, it is more preferred that heating is not performed on the flow path 12. The heating here means applying heat to the flow path 12 from heating means outside the flow path 12, such as a heater, and does not include the heat accompanying the chemical reaction of the solution and the reaction reagent (that is, reaction heat). In other words, the separation apparatus 10 of the present invention preferably has no heating means. Thus, the separation apparatus 10 can have an even more simple and inexpensive configuration. However, heating may be performed when quantitative analysis can be performed with little influence from the acid or the like used.

The liquid feed pump 20 is not particularly limited as long as it is a pump that facilitates the feed of the gas-liquid slug flow in the flow path 12, thereby being able to apply to the liquid a driving force that allows the mixing of the solution and the reaction reagent, and the gasification of the target component by the mixing, in each droplet, and the movement of the target component-derived gas produced by the gasification to the bubbles. Commercially available various pumps can be utilized. The liquid feed pump 20 is particularly preferably a tube pump such as a peristaltic pump.

At least part of the flow path 12 preferably forms the coil portion 12a wound helically or in a figure eight shape, more preferably the helically wound coil portion 12a, from the viewpoint of being able to make the flow path space-saving. The step of continuing the feed of the gas-liquid slug flow is preferably performed through the coil portion 12a. Particularly, the direction of the winding axis of the coil portion 12a is preferably the horizontal direction (that is, a state in which the coil portion 12a lies on its side). Thus, the same effect as inverting and mixing the droplets L is obtained, and therefore even when there is a difference in specific gravity between the solution and the reaction reagent, or the like, mixing is smoothly performed, and the target component in the solution can be even more efficiently separated. As shown in FIG. 1, the coil portion 12a is preferably located on the downstream side of the bubble injection means 18 and on the upstream side of the gas-liquid separator 22 (the gas feed apparatus 24 when present). For the coil portion 12a, a commercially available coil tube can be used. The coil portion 12a is also preferably made of a fluororesin such as a PTFE resin or a PFA resin, as described above regarding the flow path 12. The coil total length of the coil portion 12a is preferably a length at which the target component in the solution is sufficiently separated, for example, 0.01 to 10 m, typically 0.5 to 2 m.

From the viewpoint of balancing the quick separation of the target component and the recovery rate of the target component, for example, the liquid feed rate of the gas-liquid slug flow is preferably 0.01 to 100 mL/minutes, more preferably 0.1 to 50 mL/minutes, and further preferably 1 to 10 mL/minutes.

(4) Recovery of Target Component-Derived Gas

The target component-derived gas that has moved to the bubbles G is recovered with an absorbing liquid. This step is preferably performed by introducing the gas-liquid slug flow into the gas-liquid separator 22, while pushing the gas-liquid slug flow by a gas, to perform gas-liquid separation, and bringing the gas comprising the target component-derived gas (that is, the gas discharged from the gas outlet of the gas-liquid separator 22) separated from the gas-liquid slug flow into contact with the absorbing liquid by the recovery means 26. The gas-liquid separator 22 is not particularly limited as long as it can separate the bubbles comprising the target component-derived gas from the gas-liquid slug flow. A commercially available gas-liquid separator can be used. The recovery means 26 is not particularly limited as long as it can allow the absorbing liquid to absorb the target component-derived gas for recovery. For example, the recovery means 26 can be means such as sucking and feeding the absorbing liquid using a tube, a liquid feed pump, and the like. As the absorbing liquid, a liquid that can sufficiently dissolve the target component-derived gas should be selected. Preferably, the absorbing liquid is a liquid that selectively dissolves the target component-derived gas. For example, when Si or a compound thereof is separated and recovered in the form of $SiF_4$, a solution comprising boric acid, aluminum, zirconium, and/or a rare earth element that can dissolve $SiF_4$, or the like can be the absorbing liquid. The type of the gas for pushing the gas-liquid slug flow into the gas-liquid separator 22 is not particularly limited, and the gas may be, for example, air, nitrogen gas, argon gas, or the like.

From the viewpoint of efficiently performing gas-liquid separation, the gas feed apparatus 24 for applying a gas to the gas-liquid slug flow to feed the gas-liquid slug flow in a gas-liquid separable state to the gas-liquid separator 22 is preferably provided in the vicinity of the gas-liquid separator 22 (for example, on the downstream side of the bubble injection means 18 and on the upstream side of the gas-liquid separator 22) in the flow path 12. Examples of the gas feed apparatus 24 include an air pump that feeds a gas at a pressure around atmospheric pressure, and a compressor that feeds a compressed gas. A further gas-liquid separator may be separately provided on the downstream side of the gas-liquid separator 22 in order to separate the recovery liquid comprising the target component-derived gas (that is, the absorbing liquid in which the target component-derived gas is recovered) from the gas not comprising the target component-derived gas (that is, the gas after being discharged from the gas outlet of the gas-liquid separator 22 and brought into contact with the absorbing liquid).

(5) Quantitative Analysis of Target Component (Optional Step)

The target component separated from the solution by the steps of the above (1) to (4) is quantitatively analyzed as desired. In other words, according to a preferred aspect of the present invention, a method for analyzing a target component in a solution, comprising the steps of separating a target component from a solution by the above method; and quantitatively analyzing the target component separated from the solution is provided. In the analysis method of the present invention, the target component is separated from interfering components that can be contained in the solution by the above-described separation method, and therefore high accuracy quantitative analysis in which the influence of the interfering components is eliminated can be performed.

The step of quantitatively analyzing the target component is preferably performed by analysis equipment. Therefore, according to a preferred aspect of the present invention, an analysis apparatus comprising the separation apparatus 10 of the present invention; and analysis equipment (not shown) connected to the recovery means 26 of the separation apparatus 10 for quantitatively analyzing a target component is provided. The analysis equipment should be appropriately selected according to the type and concentration of the target component, and the like, and its type is not particularly limited. An absorptiometer is preferred in that simple analysis is possible and that it is relatively inexpensive.

Before the quantitative analysis of the target component is performed, the recovery liquid (that is, the absorbing liquid comprising the target component) may be subjected to pretreatment such as a concentration operation and a coloring operation. The type of the pretreatment is not particularly limited, and the pretreatment should be appropriately selected according to the type and concentration of the target component, the type of the analysis equipment, or the like. For example, when Si or a compound thereof is quantitatively analyzed by an absorptiometer, a coloring operation by a known method such as the molybdenum blue method described in Non Patent Literature 1 and the like is preferably performed. One example of a coloring operation by the molybdenum blue method includes adding a coloring reagent such as an ammonium molybdate solution to a recovery liquid under acidic conditions (for example, around pH 0.9), and adding a reducing reagent such as an ascorbic acid solution after the stop of the reaction. In this respect, the analysis apparatus of the present invention may comprise means for performing pretreatment such as the above coloring operation (pretreatment means) on the downstream side of the separation apparatus 10 and on the upstream side of the analysis equipment. Thus, the separation of a target component in a solution to quantitative analysis, including the pretreatment required at the time of quantitative analysis, can be collectively automatically performed. In this manner, the method and apparatus of the present invention can be preferably applied to an automatic analysis apparatus.

EXAMPLES

The present invention will be more specifically described by the following examples.

<Analysis Apparatus>

First, the configuration and specifications of the analysis apparatus used in the following examples will be described below. This analysis apparatus is represented by the system flow diagram shown in FIG. 3, and configurations other than the configurations of the flow paths (other than coil portions), coil portions, and gas-liquid separator shown below basically correspond to those of a continuous flow analysis apparatus (AutoAnalyzer, model number: AutoAnalyzer model 3 (AA3-R)) manufactured by BL TEC K.K. For the flow paths connecting the components, the three types of tubes shown below were appropriately used.

Flow path: tube made of fluororesin (manufactured by FRON INDUSTRY, product number: F-8007-009, inner diameter: 1.19 mm)

Flow path: tube made of fluororesin (manufactured by FRON INDUSTRY, product number: F-8011-001, inner diameter: 1 mm)

Flow path: tube made of fluororesin (manufactured by FRON INDUSTRY, product number: F-8007-007, inner diameter: 0.96 mm)

First coil portion: coil tube made of fluororesin (manufactured by BL TEC K.K., product number: TRA-8011-02, tube total length: 1 m, tube inner diameter: 2 mm, tube outer diameter: 3 mm, wall thickness 0.5 mm, number of coil tubes: one)

Second coil portion: coil tubes made of fluororesin (manufactured by BL TEC K.K., product number: TRA-8011-02, tube total length: 1 m, tube inner diameter: 2 mm, tube outer diameter: 3 mm, wall thickness 0.5 mm, number of coil tubes: five (coupled to each other))

Third coil portion: coil tubes made of fluororesin (manufactured by BL TEC K.K., product number: TRA-8011-02, tube total length: 1 m, tube inner diameter: 2 mm, tube outer diameter: 3 mm, wall thickness 0.5 mm, number of coil tubes: two (coupled to each other))

Gas-liquid separator: (manufactured by BL TEC K.K., product name: PFA rectifying column, product number: PFA-1000-01)

Figure 3:
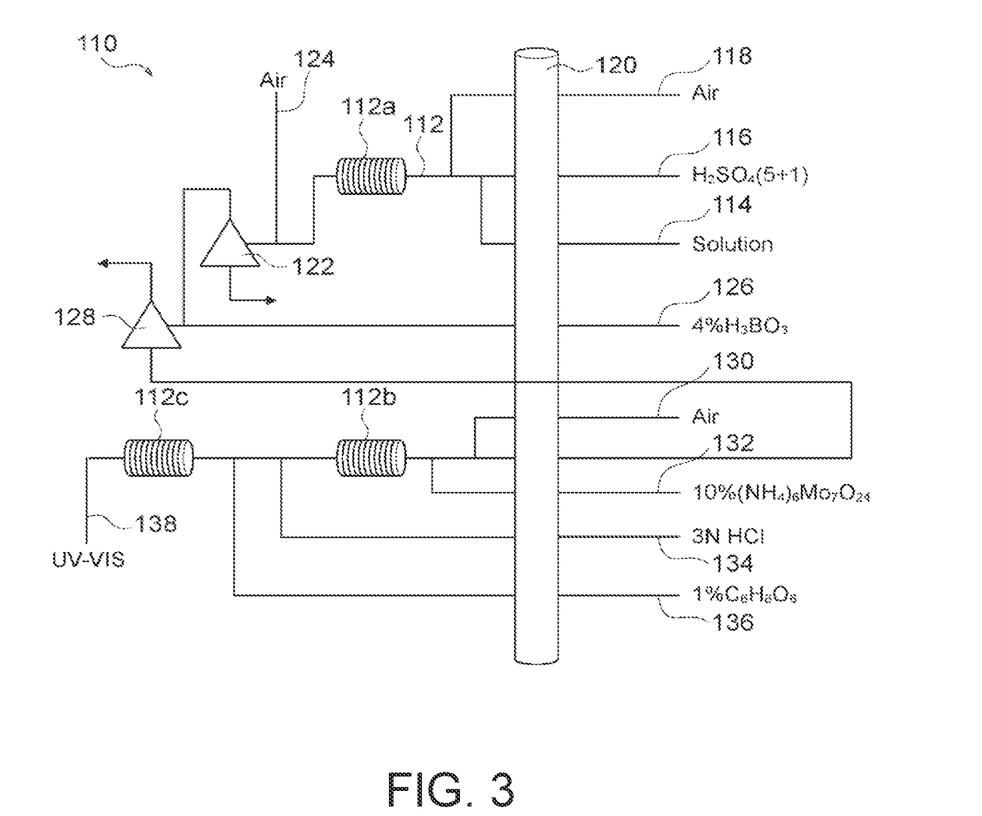
FIG. 3 is a system flow diagram of an analysis apparatus provided in Examples.

An analysis apparatus 110 shown in FIG. 3 comprises a tube made of a fluororesin as a flow path 112. The flow path 112 branches on the upstream side, and the branched flow paths 112 are connected, via a peristaltic pump (tube pump), which is a liquid feed pump 120, to an autosampler, a first reagent bottle containing sulfuric acid (5+1), and a first bubble injection apparatus respectively to form solution injection means 114, first reagent injection means 116, and first bubble injection means 118. The first bubble injection means 118 is provided on the downstream side of the solution injection means 114 and the first reagent injection means 116. The flow path 112 has a helically wound first coil portion 112a on the downstream side of this first bubble injection means 118. A first gas-liquid separator 122 is connected to the downstream side end of the flow path 112, and a compressor, which is a gas feed apparatus 124, is provided in the vicinity of the upstream side of this first gas-liquid separator 122. A recovery means 126 is connected to the gas outlet of the first gas-liquid separator 122. From an absorbing liquid bottle containing boric acid (concentration 4 w/v %) at pH 0.9, which is an absorbing liquid, this recovery means 126 feeds the absorbing liquid to the gas outlet of the first gas-liquid separator 122 via the peristaltic pump. A second gas-liquid separator 128 is connected to the downstream side of the recovery means 126, and the liquid outlet side is connected to an analysis portion. In the analysis portion, a second bubble injection apparatus and a second reagent bottle containing ammonium molybdate (concentration 10 w/v %) are connected, in this order toward the downstream side, to the flow path 112 via the peristaltic pump to form second bubble injection means 130 and second reagent injection means 132 respectively. The flow path 112 has a second coil portion 112b on the downstream side from the connection position of the second reagent injection means 132. A third reagent bottle containing hydrochioric acid (3 N) and a fourth reagent bottle containing ascorbic acid (concentration 1 w/v %) are connected in this order to the flow path 112 via the peristaltic pump on the downstream side of the second coil portion 112b to form third reagent injection means 134 and fourth reagent injection means 136 respectively. The flow path 112 has a third coil portion 112c on the downstream side from the connection position of the fourth reagent injection means 136 and is connected to an absorptiometer, which is analysis equipment 138, on the downstream side of this third coil portion 112c. The absorptiometer comprises a flow cell having a width of 1.5 mm and an optical path length of 50 mm. The first coil portion 112a, the second coil portion 112b, and the third coil portion 112c were disposed so that the direction of the winding axis was the horizontal direction. This analysis apparatus is formed in order to analyze Si in a solution, but it is needless to say that target components other than Si can be analyzed by appropriately changing the types of the reagents, and the like.

Examples A1 and A2

Standard solutions comprising Si at predetermined concentrations were made, Si was separated and analyzed according to the method of the present invention using the above apparatus, and a calibration curve was prepared to check linearity. In addition, a conventional apparatus and method, and the apparatus and method of the present invention were compared using a standard solution at a predetermined concentration. Specifically, the operations are as follows.

Example A1

Figure 4:
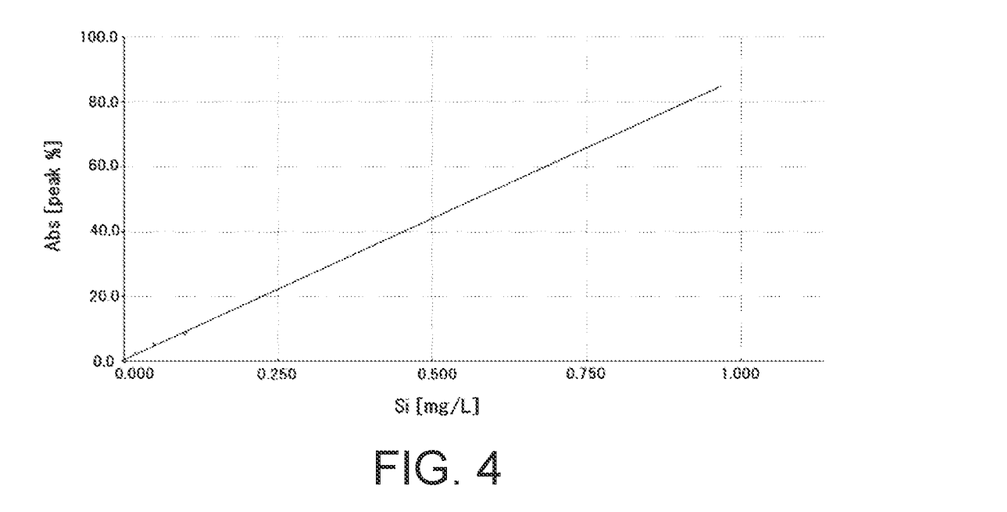
FIG. 4 is a Si calibration curve prepared in Example A1.

Si in standard solutions was separated and analyzed according to the apparatus and method of the present invention, and a calibration curve was prepared, and repeatability was checked.
(1) Preparation of Standard Solutions
From a Si 1000 mg/L solution (manufactured by KANTO CHEMICAL CO., INC., product number: 37811-2B), amounts of the solutions corresponding to 0.02 mg, 0.05 mg, 0.1 mg, and 0.5 mg in terms of Si weight were fractionated and charged into separate volumetric flasks (made of polypropylene, volume 1000 mL). For blank solution preparation, an empty volumetric flask (made of polypropylene, volume 1000 mL) in which the Si 1000 mg/L solution was not fractionated was separately provided. 165 mL of hydrofluoric acid (manufactured by Morita Chemical Industries Co., Ltd., concentration 50% by volume) was added to each volumetric flask, and the contents were set at a constant volume with pure water. In this manner, standard solutions having Si concentrations of 0 mg/L (blank), 0.02 mg/L, 0.05 mg/L, 0.1 mg/L, and 0.5 mg/L were prepared.
(2) Preparation of Calibration Curve
Si in each standard solution was separated and analyzed using the provided analysis apparatus 110. First, about 2 mL of the obtained standard solution was continuously fed to the flow path 112 by the solution injection means 114, and sulfuric acid (5+1), which was a reaction reagent, was continuously fed from the first reagent injection means 116 to the flow path 112. Bubbles were intermittently injected from the first bubble injection means 118 into the flow path 112 at intervals of once every 2 seconds to turn the mixed liquid comprising the calibration curve solution and the sulfuric acid (5+1) into a gas-liquid slug flow in which the mixed liquid was segmented into a plurality of droplets by the bubbles, and this gas-liquid slug flow was fed to the downstream side of the flow path 112 by the liquid feed pump 120 at a flow rate of about 0.1 mL/minutes. The gas-liquid slug flow that arrived just in front of the first gas-liquid separator 122 through the first coil portion 112a was pushed into the first gas-liquid separator 122 by air fed from the gas feed apparatus 124 at a pressure of 0.06 MPa to separate the gas-liquid slug flow into a gas portion and a liquid portion. The gas portion separated from the gas-liquid slug flow was brought into contact with boric acid (concentration 4 w/v %) at pH 0.9, which was an absorbing liquid, fed from the recovery means 126, and the absorbing liquid and the mixed gas were fed to the second gas-liquid separator 128, and the recovery liquid discharged from the liquid outlet was fed to the analysis portion. The time from the feed of the standard solution to the flow path 112 to the arrival of the recovery liquid at the liquid outlet of the second gas-liquid separator 128 was about 2 minutes. Then, bubbles were intermittently injected at intervals of once every 4 seconds from the second bubble injection means 130 into the flow path 112 in the analysis portion where the recovery liquid was fed, and further an ammonium molybdate solution (concentration 10 w/v %), which was a coloring reagent, was injected from the second reagent injection means 132 to turn the mixed liquid comprising the recovery liquid and the coloring reagent into a gas-liquid slug flow in which the mixed liquid was segmented into a plurality of droplets by the bubbles. After this gas-liquid slug flow passed through the second coil portion 112b, hydrochloric acid (3 N), which was a reaction-stopping liquid, and ascorbic acid (concentration 1 w/v %), which was a reducing reagent, were injected into the flow path 112 from the third reagent injection means 134 and the fourth reagent injection means 136 respectively. Then, the liquid portion of the gas-liquid slug flow that passed through the third coil portion 112c was introduced into the absorptiometer, which was the analysis equipment 138, connected to the flow path 112 end, and the absorbance at a wavelength of 800 nm was measured. From the Si concentration in each standard solution, and the absorbance of each standard solution obtained, a calibration curve of Si was prepared. The prepared Si calibration curve was as in FIG. 4. As shown in FIG. 4, the Si calibration curve shows good linearity, and its correlation coefficient r was 0.999 or more.
(3) Check of Repeatability
A standard solution having a Si concentration of 0.25 mg/L was prepared as in the above (1) except that from the Si 1000 mg/L solution, an amount of the solution corresponding to 0.25 mg was fractionated. For the 0.25 mg/L standard solution, Si was separated and analyzed as in the above (2), and from the obtained absorbance, and the Si calibration curve prepared in the above (3), the Si concentration of the 0.25 mg/L standard solution was calculated. The above operation was performed 10 times, and the standard deviation (a) and 10 times the standard deviation (10σ) were obtained. The results were as shown in Table 1.

Example A2 (Comparison)

Si in standard solutions was separated and analyzed according to a conventional apparatus and method, and a calibration curve was prepared, and repeatability was checked.
(1) Preparation of Standard Solutions
The standard solutions having Si concentrations of 0 mg/L (blank), 0.02 mg/L, 0.05 mg/L, 0.1 mg/L, and 0.5 mg/L prepared in (1) in Example A1 were used as they were.

(2) Preparation of Calibration Curve

Si in each standard solution was separated and analyzed according to "10. Silicon Quantification Method" in JIS H 1403-2001 "Methods for chemical analysis of tungsten materials". The separation instrument for Si was the same as in FIG. 1 "Example of Silicon Tetrafluoride Vaporization Apparatus" in JIS H 1403-2001 except that the volume of the vaporization container and the absorption container was changed to 100 mL. For the absorbing liquid, 50 mL of a boric acid solution (concentration 4 w/v %) was used, and the absorption time was 30 minutes. The coloration operation was performed as follows. First, the absorbing liquid was transferred to a volumetric flask (made of polypropylene, volume 100 mL), and 1 mL of hydrochloric acid (manufactured by KANTO CHEMICAL CO., INC., product number: 62900-03, trade name: "Hydrochloric acid EL 1 kg") and 5 mL of an ammonium molybdate solution (concentration 10 w/v %) were added, and then the volumetric flask was shaken and allowed to stand for 15 minutes. Then, 5 mL of hydrochloric acid and 1 mL of L-ascorbic acid (concentration 5 w/v %) were added to this volumetric flask, and the mixture was set at a constant volume of 100 mL with a boric acid solution. The volumetric flask was shaken and allowed to stand for 30 minutes, and then the absorbance at 800 nm was measured by an absorptiometer, and from the obtained absorbance, a Si calibration curve was prepared.

(3) Check of Repeatability

For the 0.25 mg/L standard solution prepared in (3) in Example A1, Si was separated and analyzed as in the above (2). From the obtained absorbance, and the Si calibration curve prepared in the above (2), the Si concentration of the 0.25 mg/L standard solution was calculated. The above operation was performed 10 times, and the standard deviation ($\sigma$) and 10 times the standard deviation ($10\sigma$) were obtained. The results were as shown in Table 1.

TABLE 1

Table 1

| Si concentration | | Ex. A1 | | Ex. A2* | |
|---|---|---|---|---|---|
| | | Analytical value of 0.25 mg/L standard solution (mg/L) | Sample concentration (μg/g) | Analytical value of 0.25 mg/L standard solution (mg/L) | Sample concentration (μg/g) |
| n | 1 | 0.261 | 1.044 | 0.257 | 25.7 |
| | 2 | 0.262 | 1.048 | 0.252 | 25.2 |
| | 3 | 0.264 | 1.056 | 0.251 | 25.1 |
| | 4 | 0.252 | 1.008 | 0.251 | 25.1 |
| | 5 | 0.259 | 1.036 | 0.256 | 25.6 |
| | 6 | 0.262 | 1.048 | 0.252 | 25.2 |
| | 7 | 0.258 | 1.032 | 0.254 | 25.4 |
| | 8 | 0.261 | 1.044 | 0.258 | 25.8 |
| | 9 | 0.264 | 1.056 | 0.250 | 25.0 |
| | 10 | 0.260 | 1.040 | 0.252 | 25.2 |
| Standard deviation $\sigma$ | | 0.00350 | 0.0133 | 0.00265 | 0.265 |
| $10\sigma$ | | 0.0350 | 0.133 | 0.0265 | 2.65 |

*indicates a Comparative Example.

When the Example (Example A1) and the Comparative Example (Example A2) are compared, substantially the same standard deviation as in the Comparative Example is obtained though in the Example, the sample concentration is low, about one twenty-fifth compared with the Comparative Example, and therefore it can be said that even when the sample concentration is low, analysis accuracy can be maintained. It can be said that this is due to the fact that the analysis was performed without the influence of contamination from the environment, or the like, and it can be said that high accuracy analysis is possible even in low concentration analysis. Further, as characteristics of the apparatus of the present invention, it is easy to increase the step in the separation portion to a plurality of steps and allow the absorbing liquid in the same recovery portion to absorb, and therefore analysis can be performed with higher sensitivity. In addition to this, by measuring a solution extracted using a solvent, the measurement sensitivity improves further.

Examples B1 to B2

A Si addition and recovery test was performed, and the recovery rate was calculated. Specifically, the operations are as follows.

Example B1

(1) Preparation of Standard Solutions

Standard solutions having Si concentrations of 0 mg/L (blank), 0.5 mg/L, 1.0 mg/L, 2.0 mg/L, and 5.0 mg/L were prepared as in (1) in Example A1 except that from the Si 1000 mg/L solution, amounts of the solutions corresponding to 0.5 mg, 1.0 mg, 2.0 mg, and 5.0 mg in terms of Si weight were fractionated.

(2) Preparation of Calibration Curve

Figure 5:
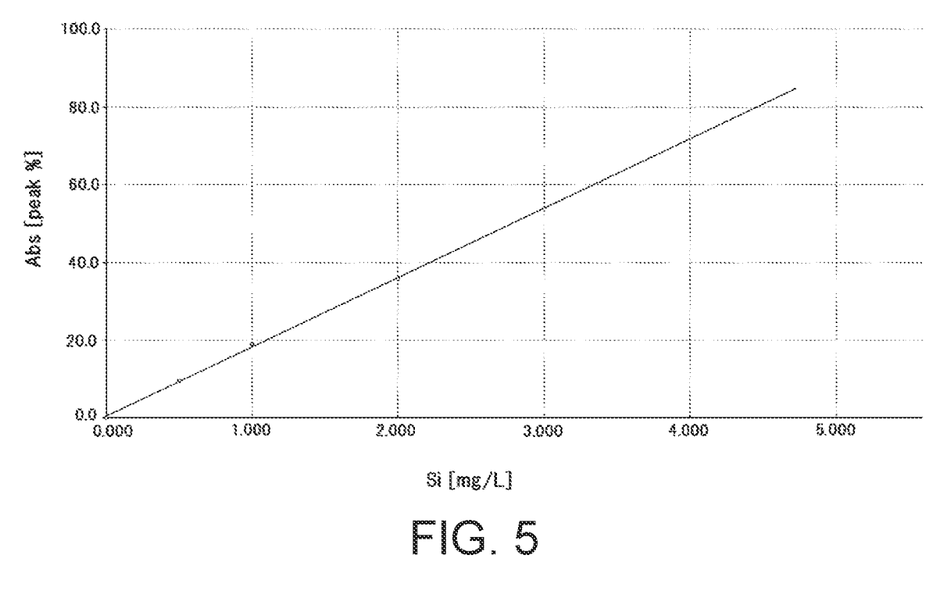
FIG. 5 is a Si calibration curve prepared in Example B1.

For each standard solution prepared in the above (1), Si was separated and analyzed as in (2) in Example A1. From the Si concentration in each standard solution, and the absorbance of each standard solution obtained, a calibration curve of Si was prepared. The prepared Si calibration curve was as in FIG. 5. As shown in FIG. 5, the Si calibration curve shows good linearity, and its correlation coefficient r was 0.999 or more.

(3) Separation and Analysis of Sample Solutions 1.0 g of a $Ta_2O_5$ sample provided as a real sample was weighed and charged into a pressure decomposition container (manufactured by SAN-AI Kagaku Co. Ltd., product number: HUS-25), and further 4.0 mL of hydrofluoric acid (1+1) was added, and then the pressure decomposition container was heated at 150° C. for 5 hours using a dryer (manufactured by Yamato Scientific Co., Ltd., product number: DS400). The hydrofluoric acid (1+1) was prepared by adding 1 volume of water to 1 volume of hydrofluoric acid (manufactured by Morita Chemical Industries Co., Ltd., concentration 50% by volume). In this manner, a sample solution in which the real sample was pressure-decomposed was obtained. The above operation was carried out twice to obtain two sample solutions. For these sample solutions, Si in the solutions was separated and analyzed as in (2) in Example A1. The obtained absorbance, and the Si concentrations in the sample solutions were calculated. The results were as shown in Table 2.

Example B2

Si in solutions was separated and analyzed as in (3) in Example B1 except that for the real sample, from a Si 100 mg/L solution made by diluting a Si 1000 mg/L solution, 0.1 mL of the solution was fractionated, and 4.0 mL of hydrofluoric acid (1+1) was added, and then pressure decomposition was performed to prepare each Si-added sample solution in which Si corresponding to 2.5 mg/L was added. From the obtained absorbance, and the Si calibration curve prepared in (2) in Example B1, the Si concentrations in the Si-added sample solutions were calculated, and the average value of the Si concentrations was obtained. From the Si concentration average value of the Si-added sample solutions obtained, the Si concentration average value of the sample solutions obtained in Example B1 was subtracted, and the result was divided by the Si addition concentration (corresponding to 2.5 mg/L) to obtain the recovery rate of Si. The results were as shown in Table 2.

TABLE 2

Table 2

| | | Si concentration [mg/L] | | | |
|---|---|---|---|---|---|
| | | n | | | Si recovery |
| Solution type | | 1 | 2 | Average | rate [%] |
| Ex. B1 | Ta$_2$O$_5$ + HF(1 + 1) | 0.066 | 0.071 | 0.0685 | — |
| Ex. B2 | Ta$_2$O$_5$ + HF(1 + 1) + Si2.5 mg/L | 2.499 | 2.585 | 2.542 | 98.94 |

As shown in Table 2, the Si recovery rate when Si is added to the real sample is a value close to 100%, 98.94%, and therefore it can be said that it was confirmed that Si was reliably vaporized and separated and that accurate analysis was performed without the influence of the interfering components contained in the real sample and the like. In this manner, it is found that according to the method of the present invention, a target component can be separated quickly but efficiently, and thus high accuracy quantitative analysis of a target component in which the influence of interfering components contained in a real sample and the like, is eliminated is possible.

The invention claimed is:

1. A method for separating a target component in a solution, comprising the steps of:
   providing a solution comprising a target component, and a reaction reagent capable of gasifying the target component;
   while continuously feeding the solution and the reaction reagent to a flow path, intermittently injecting bubbles into the flow path to produce a gas-liquid slug flow in which a mixed liquid comprising the solution and the reaction reagent is segmented into a plurality of droplets by the bubbles;
   continuing the feed of the gas-liquid slug flow in the flow path, thereby facilitating the mixing of the solution and the reaction reagent, and the gasification of the target component by the mixing, in each droplet, and the movement of a target component-derived gas produced by the gasification to the bubbles; and
   recovering the target component-derived gas that has moved to the bubbles with an absorbing liquid,
   wherein the gasification of the target component is performed at a temperature less than a boiling point of the solution,
   wherein the step of recovering the target component-derived gas with an absorbing liquid is performed by performing gas-liquid separation while pushing the gas-liquid slug flow by a gas, and bringing a gas separated from the gas-liquid slug flow into contact with the absorbing liquid.

2. The method according to claim 1, wherein at least part of the flow path forms a coil portion wound helically or in a figure eight shape, and the step of continuing the feed of the gas-liquid slug flow is performed through the coil portion.

3. The method according to claim 1, wherein the target component is Si or a compound thereof and/or is F or a compound thereof.

4. The method according to claim 1, wherein the target component-derived gas is in a form of a fluoride.

5. The method according to claim 1, wherein the solution comprises hydrofluoric acid, and the reaction reagent comprises sulfuric acid.

6. A method for analyzing a target component in a solution, comprising the steps of:
   separating the target component from the solution according to the method according to claim 1; and
   quantitatively analyzing the target component separated from the solution.

7. The method according to claim 6, wherein the step of quantitatively analyzing the target component is performed by an absorptiometer.

8. A separation apparatus for use in the method of claim 1, comprising:
   a flow path for flowing a solution comprising a target component, and a reaction reagent capable of gasifying the target component;
   solution injection means provided on an upstream side of the flow path for continuously injecting the solution into the flow path;
   reagent injection means provided on the upstream side of the flow path for continuously injecting the reaction reagent into the flow path;
   bubble injection means connected to the upstream side of the flow path and a downstream side of the solution injection means and the reagent injection means for intermittently injecting bubbles into the flow path to produce a gas-liquid slug flow in which a mixed liquid comprising the solution and the reaction reagent is segmented into a plurality of droplets by the bubbles;
   a liquid feed pump that facilitates the feed of the gas-liquid slug flow in the flow path, thereby allowing the mixing of the solution and the reaction reagent, and the gasification of the target component by the mixing, in each droplet, and the movement of a target component-derived gas produced by the gasification to the bubbles;
   a gas-liquid separator connected to a downstream side end of the flow path for separating the bubbles comprising the target component-derived gas from the gas-liquid slug flow; and
   recovery means connected to a gas outlet of the gas-liquid separator for allowing an absorbing liquid to absorb the target component-derived gas for recovery.

9. The apparatus according to claim 8, further comprising a gas feed apparatus provided in the vicinity of the gas-liquid separator in the flow path for applying a gas to the gas-liquid slug flow to feed the gas-liquid slug flow in a gas-liquid separable state to the gas-liquid separator.

10. The apparatus according to claim 8, wherein at least part of the flow path is wound helically or in a figure eight shape to form a coil portion.

11. The apparatus according to claim 8, wherein the flow path has an inner diameter of 0.05 to 20 mm.

12. The apparatus according to claim 8, wherein the target component is Si or a compound thereof and/or is F or a compound thereof.

13. The apparatus according to claim 8, wherein the flow path is composed of a resin.

14. An analysis apparatus for analyzing a target component in a solution, comprising:
the separation apparatus according to claim 8; and
analysis equipment connected to the recovery means of the separation apparatus for quantitatively analyzing the target component.

15. The apparatus according to claim 14, wherein the analysis equipment is an absorptiometer.

* * * * *